United States Patent [19]
Lanasa

[11] Patent Number: 5,515,885
[45] Date of Patent: May 14, 1996

[54] PLUG ASSEMBLY

[76] Inventor: Douglas Lanasa, P.O. Box 753, Channelview, Tex. 77530

[21] Appl. No.: 218,052

[22] Filed: Mar. 25, 1994

Related U.S. Application Data

[63] Continuation-in-part of Ser. No. 188,023, Jan. 28, 1994.

[51] Int. Cl.⁶ ................................................. F16L 55/10
[52] U.S. Cl. ................................................. 138/90; 138/98
[58] Field of Search ................................. 138/89, 90, 98; 411/55, 65, 63, 64, 66, 67, 68; 73/49.5, 49.8

[56] References Cited

U.S. PATENT DOCUMENTS

| | | | |
|---|---|---|---|
| 3,857,414 | 12/1974 | Richardson et al. | 138/90 |
| 3,920,048 | 11/1975 | Mingus | 138/89 |
| 3,978,892 | 9/1976 | Scodino | 138/90 |
| 4,385,643 | 5/1983 | Noe | 138/90 |
| 4,393,674 | 7/1983 | Rasmussen | 73/49.8 |
| 4,452,070 | 6/1984 | Kipp | 138/89 |
| 4,474,216 | 10/1984 | Noe | 138/90 |
| 4,571,986 | 2/1986 | Fujii et al. | 73/49.8 |
| 4,602,500 | 7/1986 | Kelly | 138/90 |
| 4,611,485 | 9/1986 | Leslie | 138/90 |
| 4,753,108 | 6/1988 | Jänsch | 138/90 |
| 5,181,543 | 1/1993 | Hendzel | 138/90 |
| 5,337,598 | 8/1994 | Rab | 138/90 |

*Primary Examiner*—David Scherbel
*Assistant Examiner*—James F. Hook
*Attorney, Agent, or Firm*—Keaty & Keaty

[57] ABSTRACT

The invention relates to a plug devices for sealing an open end of a pipe which is being tested for structural integrity. The plug assembly has a reduced diameter first portion which is adapted for engagement with the interior of the pipe and a second, enlarged diameter portion which houses a piston that slidably moves within the central opening of the second portion. A compressible flexible packer element mounted on the first portion is compressed by the piston of the second portion to facilitate fluid-tight engagement with the interior of the pipe. The second portion of the assembly is provided with suitable ports for admitting setting and release pressure acting on the piston. One of the plug assemblies has a transverse bore for engagement with an inlet valve for admitting pressurized fluid into the interior of the pipe. A companion plug assembly adapted for engaging the opposite end of the pipe has a transverse bore fitted with a relief valve for allowing escape of air while the pipe is being filled with test fluid and allowing relief of pressure after the test has been completed.

15 Claims, 1 Drawing Sheet

PLUG ASSEMBLY

CROSS REFERENCED TO RELATED APPLICATIONS

This application is a continuation-in-part of my co-pending application Ser. No. 188,023 filed on Jan. 28, 1994 entitled "A Pipe Testing System", a full disclosure of which is incorporated by reference herein.

BACKGROUND OF THE INVENTION

This invention relates to pipe testing equipment, and more particularly to a plug assembly adapted to seal an end of a pipe which is being tested.

In many field operations, it is important to determine structural integrity of a pipe wall and to find pipe segments which have cracks or punctures, and which cannot function under operational pressure. Loss of pressure which might occur through a leak or a crack in the pipe will adversely affect the cost of operation, can lead to escape of hazardous material and contamination of the area wherein the pipeline is located. To prevent such problems, the industry requires that the pipe segments be tested in an efficient and cost-productive manner. Since the pipe segments are conventionally tested by pressurizing the interior of the pipe, the opposite ends of the pipe segment must be sealed from the atmosphere, while allowing introduction of a test fluid into the interior of the pipe. The present invention contemplates provision of a plug assembly suitable for such purpose.

SUMMARY OF THE INVENTION

It is, therefore, an object of the present invention to provide a plug assembly suitable for sealing an open end of a pipe.

It is another object of the present invention to provide a plug assembly which is adapted to allow a test fluid to be delivered into the interior of the pipe segment.

It is a further object of the present invention to provide a plug assembly suitable for admitting pressure into the interior of the pipe prior to testing and suitable for releasing said pressure after the test has been completed.

These and other objects of the present invention are achieved through a provision of a plug assembly adapted for sealing an open end of a pipe when the pipe is being tested for structural integrity. The plug assembly comprises a first, test portion which is adapted for sealing engagement with the interior of a pipe and a second portion adapted for receiving pressurized fluid and transmitting it into the interior of the pipe through the first, test portion. The second portion is co-axially unitary attached to the first portion and comprises a first and a second housing member which have central co-axially extending openings adapted to receive a sliding piston therein. An elongated tubular mandrel connects the first, test portion and a second, hydraulic portion of the plug assembly. A compressible flexible packer element mounted in the surrounding relationship about the test portion of the mandrel is compressed, to some degree, by the sliding piston and assures a fluid tight seal.

A number of transverse openings are formed in the first and second housing members, so as to admit setting pressure into the interior of the second portion, release the setting pressure, as well as to admit pressurized fluid into the interior of the pipe and to relieve the pressure in the interior of the pipe. The tip of the test portion of the plug assembly is sized and shaped to facilitate positioning of that portion within an open end of the pipe.

BRIEF DESCRIPTION OF THE DRAWINGS

Reference will now be made to the drawings, wherein like parts are designated by like numerals, and wherein.

DETAILED DESCRIPTION OF THE PREFERRED EMBODIMENT

Figure 1:
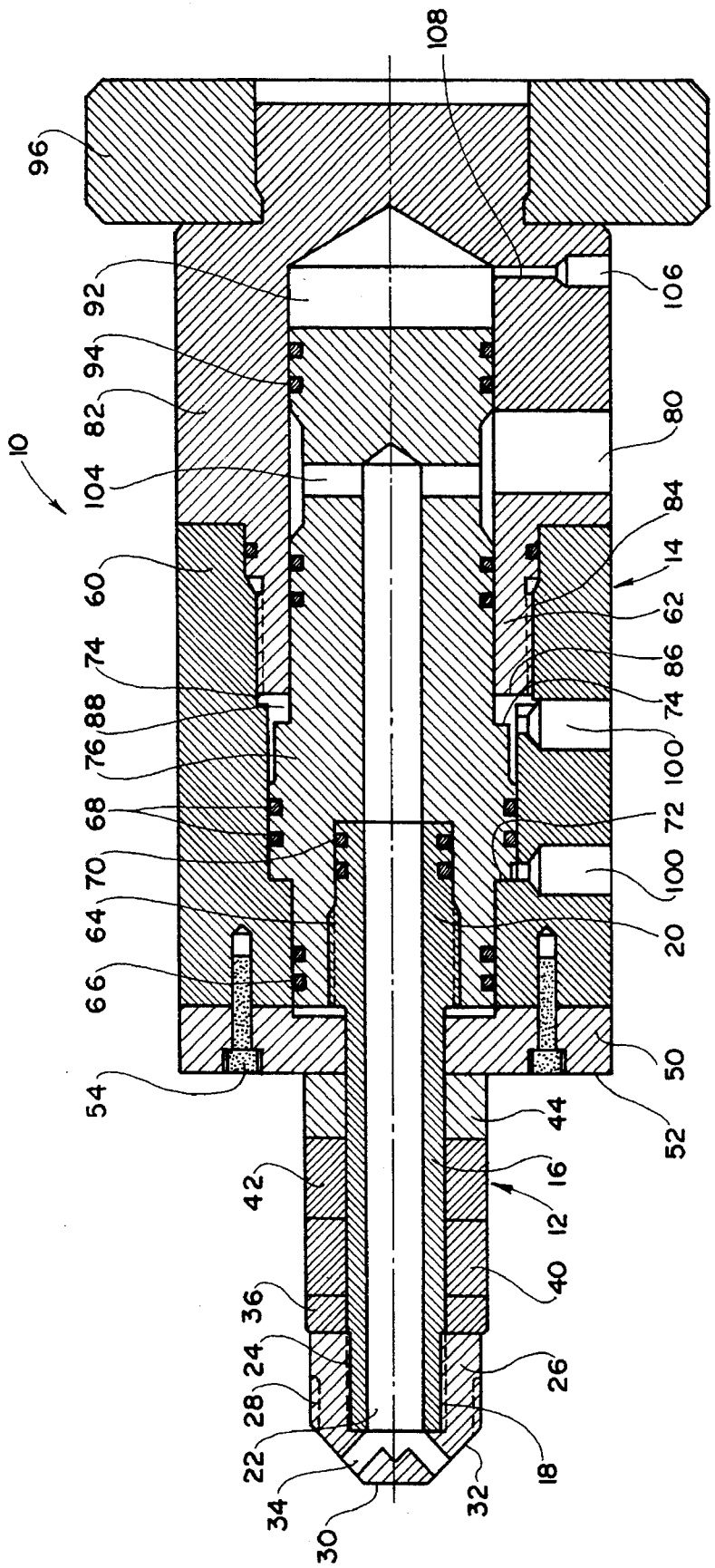
FIG. 1 is a cross sectional view of the plug assembly in accordance with the present invention.

Referring now to the drawings in more detail, numeral 10 designates a plug assembly in accordance with the present invention. The plug assembly comprises a test portion or end 12 and a hydraulic portion or end 14. Connecting the ends 12 and 14 is an elongated tubular mandrel 16 having a forward most portion 18 and a distal portion 20. A central opening 22 extends substantially through the entire length of the mandrel 16 from its forwardmost portion 18 to the distal portion 20.

The forwardmost portion 18 is provided with exterior threads 24 which engage an internally matchingly threaded nose portion 26. The nose portion 26 has a polygonal shape having exterior flat surfaces 28 which are adapted for engagement by a wrench. An innermost tip 30 of the nose portion 26 has inwardly inclined surface 32 to allow easy positioning of the nose portion within an open end of a pipe being tested. A central opening is formed in the nose portion 26, that opening is co-aligned with the opening 22 of the mandrel 16 to allow a test fluid to be delivered into the interior of a pipe (not shown). If desired, the central opening can be divided into two or more inlet channels 34 through which the fluid travels from the central opening into the pipe.

Mounted in a circumferential relationship about the mandrel 16 and in abutting relationship to the nose portion 26 is an inner support 36, the opposite surface of which forms a contact surface for a compressible, flexible packer element 40. The packer 40 is circumferentially mounted about the exterior of the mandrel 16 and has an inner opening sized and shaped to fittingly slidably engage the exterior surface of the mandrel 16. An outer support ring 42 abuts the compressible flexible packer element 40 on the opposite side from the inner support 36.

A spacer ring 44 is mounted farther from the forwardmost end of the test portion 12 and separates the outer support 42 from an inner securing plate 50. The plate 50 has a greater diameter than the mandrel 16, and the ring element 44, such that an enlarged shoulder 52 is formed between the exterior surface of the plate 50 and the exterior surface of the ring element 44.

The shoulder 52 is provided with at least one bore to accommodate therein a securing element, such as for example a socket cap screw 54. The securing element(s) 54 fixedly attaches the inner plate 50 to a first housing member, or oil housing 60 which forms a part of the hydraulic portion of the assembly. The first housing member, or oil housing 60 houses a hydraulic piston 62 which is adapted to move, to a limited degree, within a central opening of the first housing member, or oil housing 60. A front end of the piston 62 is threadably engaged, such as at 64, to the distant end 20 of the mandrel 16. One or more O-rings 66 are fitted within grooves formed on the exterior of the piston 62 adjacent the distant end 20 of the mandrel 16. Another pair of O-rings 68 fittingly engage corresponding grooves between the piston and a middle portion of the first housing member or oil housing 60. The mandrel's distant end 20 is sealed against the piston 62 by O-rings 70 mounted in the corresponding grooves formed on the exterior surface of the mandrel 16.

The interior wall of the first housing member 60 is formed with a pair of shoulders 72 and 74, while the piston 62 is formed with an enlarged diameter middle portion 76. A distal surface of the central portion 76 abuts the shoulder 74 when the piston 62 is forced backward under the hydraulic pressure admitted through an opening 100 formed in the wall of a second housing member or oil housing 60. The second housing member 82 is fixedly attached to the first housing member 60, such as by threads 84 which are formed on the exterior surface of the second housing member, water housing 82 and the interior surface of the first housing member 60.

The externally threaded part of the second housing member 82 is fitted between the inner wall of the first housing member 60 and exterior wall of the piston 62, such that the forwardmost end 86 of the second housing member 82 appears adjacent to the shoulder 74 of the first housing member 60 and forms a limit to the travel of the piston 62. The piston 62 is allowed to travel within the space designated by numeral 88 in the drawing.

The most distant end 90 of the piston 62 is housed within the central opening 92 of the second housing member 82 and is sealed against the interior wall by suitable sealing elements, such as O-rings 94. A top plate 96 threadably engages the distal end of the second housing member 82, the top plate 96 being sized and shaped to facilitate manual engagement thereof when the plug assembly 10 is positioned in a fluid-type sealing relationship with an open end of the pipe segment.

The plug assembly 10 is provided with means for admitting pressurized fluid and for relieving pressure during operation of the plug assembly. A counter bore 100 allows set pressure to be applied on that shoulder of the hydraulic piston 62 which is adjacent to the shoulder 72 of the first housing member 60. Release of pressure is accomplished through a counterbore 102 spaced from the counterbore 100 and also made in the body of the first housing member 60. Both counterbores 100 and 102 communicate with a central opening made in the first housing member 60. The second housing member 82 is likewise provided with a transverse counterbore 80 to admit the pressurized fluid into the channel 104 which is in fluid communication with co-axially aligned central openings of the piston 62, mandrel 16 and the nose portion 34.

It should be noted that there are two plug assemblies for sealing a respective end of the pipe segment being tested. The plug assemblies are essentially similar and each of the plug assemblies is provided with a set bore 100, release bore 102, as well as opening 80. The plug assembly which is located at the lower end of the pipe is connected to an inlet valve through the opening 80. That valve (not shown) is designed to allow fluid to fill the pipe segment and pressurize the pipe. The plug assembly which is located at the upper end of the pipe segment is connected to a relief valve (not shown) through the opening 80. That relief valve is designed to allow air to escape while the pipe segment is being filled with fluid and to release pressure from the pipe once the testing is completed.

In operation, the compressible flexible packer element 40 on the test end of the plug assembly is compressed as pressure is applied to the set port 100 which exerts a pressure on the adjacent shoulder of the hydraulic piston 62. The hydraulic piston is thereby moved back, and the nose 26 of the test end is displaced, since it is designed to travel along with the piston through its fixed engagement to the mandrel 16.

When the compressible flexible packer element 40 is compressed, it seals the internal diameter of each end of the pipe. The pipe segment is positioned on an incline and is filled through the fluid pressure port 80 at the lower end of the pipe segment. The operator then watches the upper end of the pipe segment and shuts off the relief valve (not shown) which is positioned within the relief port 80 when the fluid begins to flow from that port.

After the relief valve is shut off, the pipe is pressurized through the fluid pressure port 80 for a specified period of time to test the integrity of the pipe. Once the test is complete, the pressure is released through the upper end of the pipe segment through the relief valve (not shown) which is positioned within the relief port 80. The piston then moves to the position illustrated in FIG. 1 of the drawing by applying hydraulic pressure to port 102. At this time the plug assembly 10 is removed from its sealing engagement with the pipe.

The pipe segment is then removed from a test station and the plug assembly 10 is engaged with the next pipe being tested.

Many changes and modifications can be made in the design of the present invention without departing from the spirit thereof. I, therefore, pray that my rights to the present invention be limited only by the scope of the appended claims.

I claim:

1. A plug assembly for sealing an open end of a pipe, the plug assembly comprising:

a first portion adapted for sealing engagement with an interior of the pipe, said first portion comprising a compressible means for facilitating creation of a fluid-tight seal, an elongated tubular mandrel having central opening extending through its entire length, said mandrel carrying a nose portion on its proximal end and a piston means on its distal end, said compressible means being positioned in a surrounding relationship over a part of said mandrel between said nose portion and said piston means;

a second portion fixedly attached to the first portion, said second portion comprising means for applying a compression force on the compressible means of the first portion; and a means for admitting pressurized fluid into said pipe, said means comprising a transverse port formed in said second housing member in fluid communication with a central opening extending through said piston means, the central opening of the mandrel and with the interior of the pipe through said nose portion.

2. The assembly of claim 1, wherein at least a part of said mandrel extends into said second portion.

3. The assembly of claim 1, wherein said second portion comprises a first housing member mounted in a surrounding relationship about at least a part of said piston means, said piston means being adapted for a limited sliding movement between a first position, applying the compression force on said compressible means, and a second position, releasing the compression force.

4. The assembly of claim 3, wherein said first housing member has an inner wall which is provided with a pair of spaced-apart inwardly extending shoulders, and said piston means is provided with an outwardly extending shoulder which contacts one of said first housing member inner shoulders when the plug assembly is in a sealing engagement with a pipe end.

5. The assembly of claim 3, wherein said second portion further comprises a second housing member co-axially fixedly attached to said first housing member, said second housing member having a reduced diameter portion which fits within said first housing member in a surrounding relationship about a distal end of said piston means.

6. The assembly of claim 5, wherein a proximal end of said second housing member abuts the second inwardly extending shoulder of said first housing member and forms a means for limiting sliding movement of the piston means within the second portion.

7. The assembly of claim 4, wherein said first housing member is provided with a proximal transverse port adjacent one inwardly extending shoulder, so as to allow admission of a piston setting pressure into said first housing member, and a distal transverse port for releasing said piston setting pressure, said distal transverse port being formed adjacent another inwardly extending shoulder of the first housing member.

8. The assembly of claim 6, further comprising means for relieving pressure from interior of the pipe, said pressure relieving means comprising a transverse bore formed in the second housing member adjacent its most distal end.

9. The assembly of claim 1, wherein said nose portion has a reduced diameter tip sized and shaped to facilitate positioning of the nose portion in the pipe open end.

10. A plug assembly for sealing an open end of a pipe, the plug assembly comprising a first portion adapted for sealing engagement with an interior of the pipe, said first portion comprising a compressible means for facilitating creation of a fluid-tight seal and further comprising an elongated tubular mandrel having a central opening extending through its entire length, said mandrel carrying a nose portion on its proximal end, a piston means on its distal end, and said compressible means between said nose portion and said piston means;

a second portion fixedly attached to the first portion, said second portion comprising means for applying a compression force on the compressible means of the first portion, and wherein at least a part of said mandrel extends into the second portion; and a means for admitting pressurized fluid into said pipe, said means comprising a transverse port formed in said second portion in fluid communication with a central opening which extends through said piston means, the central opening of the mandrel and with the interior of the pipe through said nose portion.

11. The assembly of claim 10, wherein said second portion comprises a first housing member mounted in a surrounding relationship about at least a part of said piston means, said piston means being adapted for a limited sliding movement between a first position, applying a compression force on said compressible means, and a second position, releasing the compression force, said second portion further comprising a second housing member coaxially fixedly attached to said first housing member, said second housing member having a reduced diameter part which fits within said first housing member in a surrounding relationship about a distal end of said piston means.

12. The assembly of claim 11, wherein said first housing member has an inner wall which is provided with a pair of spaced-apart inwardly extending shoulders, and said piston means is provided with an outwardly extending shoulder which contacts one of said first housing member shoulders when the plug assembly is in a sealing engagement with a pipe end.

13. The assembly of claim 11, wherein a proximal end of said second housing member abuts the second inwardly extending shoulder of said first housing member and forms a means for limiting sliding movement of the piston means within the second portion.

14. The assembly of claim 12, wherein said first housing member is provided with a proximal transverse port adjacent one inwardly extending shoulder for allowing admission of a piston setting pressure into said first housing member and a distal transverse port for releasing said piston setting pressure, said distal transverse port being formed adjacent another inwardly extending shoulder of the first housing member.

15. The assembly of claim 13, further comprising means for relieving pressure in interior of the pipe, said pressure relieving means comprising a transverse bore formed in the second housing member adjacent its most distal end.

\* \* \* \* \*